(12) United States Patent
Spörl et al.

(10) Patent No.: US 7,270,622 B2
(45) Date of Patent: Sep. 18, 2007

(54) ACCELERATION MODE FOR A VEHICLE WITH A CONTINUOUS TRANSMISSION

(75) Inventors: Peter Spörl, Ravensburg (DE); Oliver Iden, Weissensberg (DE)

(73) Assignee: ZF Friedrichshafen AG, Friedrichshsafen (DE)

( * ) Notice: Subject to any disclaimer, the term of this patent is extended or adjusted under 35 U.S.C. 154(b) by 173 days.

(21) Appl. No.: 11/181,529

(22) Filed: Jul. 14, 2005

(65) Prior Publication Data

US 2006/0014606 A1  Jan. 19, 2006

(30) Foreign Application Priority Data

Jul. 15, 2004  (DE)  .................. 10 2004 034 098

(51) Int. Cl.
*B60K 31/00* (2006.01)
*B60K 31/04* (2006.01)
*G06F 7/00* (2006.01)
*G06F 17/00* (2006.01)
*G06F 19/00* (2006.01)

(52) U.S. Cl. .............................. 477/42; 701/53; 701/70
(58) Field of Classification Search ................. 477/37, 477/42; 701/51, 53, 70
See application file for complete search history.

(56) References Cited

U.S. PATENT DOCUMENTS

| | | | |
|---|---|---|---|
| 6,442,467 B1 * | 8/2002 | Schuler et al. ............... | 701/51 |
| 6,662,095 B1 * | 12/2003 | Habeck ....................... | 701/51 |
| 6,676,567 B2 * | 1/2004 | Saito ........................ | 477/143 |
| 7,194,341 B2 * | 3/2007 | Altenkirch ................... | 701/1 |
| 2005/0197234 A1 * | 9/2005 | Reuschel et al. ............. | 477/41 |
| 2005/0227809 A1 * | 10/2005 | Bitzer et al. ................ | 477/37 |

FOREIGN PATENT DOCUMENTS

| | | |
|---|---|---|
| DE | 41 20 546 A1 | 12/1992 |
| DE | 196 11 431 A1 | 9/1997 |
| DE | 100 60 346 A1 | 6/2001 |
| DE | 199 63 354 A1 | 7/2001 |
| DE | 102 38 218 A1 | 10/2003 |
| DE | 102 38 754 A1 | 10/2003 |
| DE | 102 38 216 A1 | 11/2003 |
| WO | WO 03067127 A2 * | 8/2003 |
| WO | WO 2004029483 A1 * | 4/2004 |

* cited by examiner

*Primary Examiner*—Tisha Lewis
(74) *Attorney, Agent, or Firm*—Davis Bujold & Daniels, P.L.L.C.

(57) ABSTRACT

An acceleration mode recommended for a vehicle with a continuously variable transmission, within the scope of which, after the shift takes place, the engine speed progress will continue as a function of the speed with a calibrated rotational speed gradient (H), the rotational speed gradient is greater in the acceleration mode than the rotational speed gradient within the scope of a standard driving strategy.

9 Claims, 3 Drawing Sheets

ACCELERATION MODE FOR A VEHICLE WITH A CONTINUOUS TRANSMISSION

This application claims priority from German Application Serial No. 10 2004 034 098.6 filed Jul. 15, 2004.

FIELD OF THE INVENTION

The present invention relates to a method for accelerating a vehicle having an infinitely variable transmission.

BACKGROUND OF THE INVENTION

It is known in the art of vehicles which have an infinitely variable transmission that a desired RPM is obtained depending on the position of the gas pedal and on the vehicle speed, which speed according the transfer function (shift down or shift up) provides for an RPM increase as a function of speed.

A steeper speed gradient (as a function of speed) normally allows the driver to enjoy better responsiveness. This is based on many years of experience with stepwise automatic transmissions and stick-shift transmissions, which have a high speed gradient at lower gears.

To achieve a high speed gradient, the desired RPM should be low at low speeds and high at high speeds. This leads to a tradeoff between the RPM gradient and the RPM level after shifting down at different speed.

The present invention is based on the problem of providing a method for accelerating a vehicle with an infinitely variable transmission, which ensures a steep RPM gradient and eliminate disadvantages of the state of the art.

This problem is solved by using the distinguishing features of claim 1. Further features and advantages of the invention are recited in the subordinate claims.

SUMMARY OF THE INVENTION

Accordingly, an acceleration method is provided with which, after a shift, RPM is developed as a function of the speed with a calibrated RPM gradient, with the RPM gradient being higher in the acceleration mode than it is during normal driving mode. It is thus provided that the RPM gradient can be defined or determined based on the gas pedal position and vehicle speed when entering the acceleration mode. It is preferred that the desired RPM of the downshift be defined regardless of the required gradient.

According to one embodiment of the invention, the RPM is calculated in the acceleration mode using the following formula:

$$n[1/\min]=n\_alt[1/\min]+ng\_acc[(1/\min)/(km/h)]* a\_fzg[km/h/s]*\Delta t[s]$$

wherein n is the RPM in the acceleration mode, n_alt is the RPM in the acceleration mode in the previous computation cycle, ng_acc is the RPM gradient (n/v gradient) in the acceleration mode, a_fzg is the vehicle acceleration, and Δt is the time interval between the consecutive computation steps (cycle time).

In order to avoid reaching the RPM that is too high during a speed increase, according to the invention, there is provided a maximum RPM level depending on the gas pedal position, with the RPM gradient being modified based on the actual difference between the actual RPM and this maximum RPM level.

According to the invention, it is possible to exit the acceleration mode and to return to the desired RPM when the maximum speed depending on the gas pedal position is exceed or when the gas pedal is retracted.

Moreover, when the gas pedal value is increased during the acceleration phase, the downshift is carried out. In order to implement this, an RPM offset between the operation point in and out of the acceleration mode is obtained. Based on the higher RPM gradients of the operation point without acceleration mode, a shift is detected, so the offset is maintained or slightly reduced in such a manner as to ensure a downshift desired by the driver, and when the downshift is completed, the RPM gradient continues to be in line with the RPM level.

Similarly to that, when the gas pedal is retracted, the upshift can be carried out.

BRIEF DESCRIPTION OF THE DRAWINGS

The invention will now be described with reference to the accompanying drawings, in which.

DETAILED DESCRIPTION OF THE INVENTION

In all the accompanying drawings, the variation of the shortest and the longest total transmission ratio is shown as curves A and B, and the variation of the RPM at lower and higher speed is shown as curves C and D. Further, the variation of the gas pedal position fpw is shown under the seed vs. RPM chart as a function of the vehicle speed v for downshift at lower and higher speed, with curve E being for lower speed and curve F, for higher speed.

Figure 1:
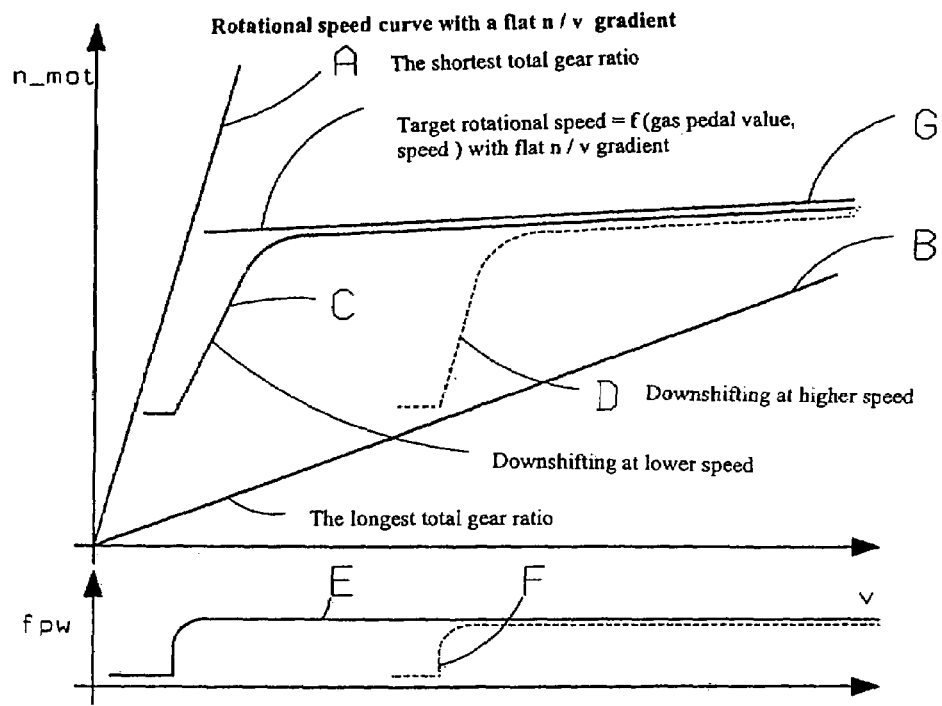
FIG. 1 is a chart showing speed vs. engine RPM, illustrating the RPM variation at downshift for a vehicle having an infinitely variable transmission according to the state of the art.

As shown in FIG. 1, with a vehicle having an infinitely variable transmission, variation is flat after downshift to a desired RPM.

The downshift is carried out from a certain gas pedal position is apparent in the Figure. Hereby, due to the flat course of the rotational speed G without the acceleration mode as a function of the speed, it will not provide the driver with a sporty impression.

Figure 2:
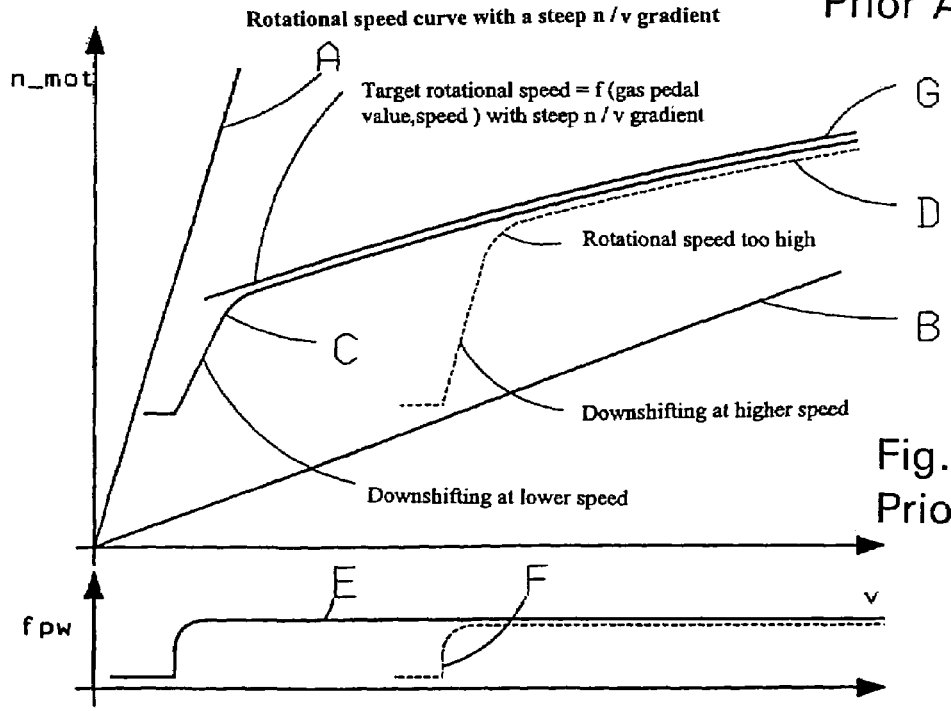
FIG. 2 is a chart showing speed vs. engine RPM, illustrating the RPM variation at downshift for a vehicle having an infinitely variable transmission with a steep RPM gradient.

During a steep course of the rotational speed as function of the speed or, as the case may be, during a steep rotational speed gradient according to the state of the art a compromise between the gradient and the rotational speed level becomes necessary, as can be observed in FIG. 2, since the target rotational speed can turn out to be too high, especially during a downshift at high speeds; on the other hand, the target rotational speed can be very low at slow speeds. This is due to the fact that the target rotational speed at low speeds must be low and at high speeds must be high to achieve a desired steep rotational speed gradient.

Figure 3:
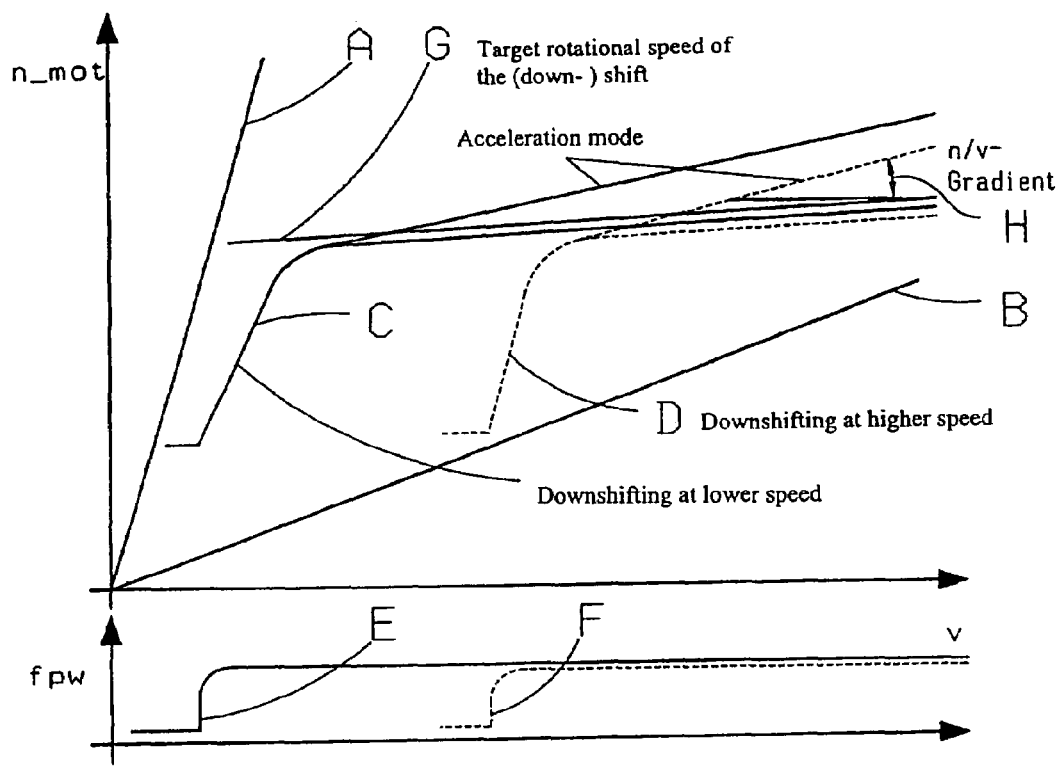
FIG. 3 is a chart showing speed vs. engine RPM, which illustrates the RPM variation at downshift with the acceleration mode according to the invention.

According to the invention, an acceleration mode is suggested within the framework of which after a downshift the rotational speed development will be continued as a function of the speed with a calibrated rotational speed gradient. Here the rotational speed gradient will preferably be defined by the gas pedal value and the vehicle speed at the start of the acceleration mode. The acceleration mode is the object of FIG. 3. Here, after the downshift has taken place, a flat rotational speed course G, not represented in FIG. 1, will be aimed for; the rotational speed increases with the increasing speed according to the calibrated gradient such that a sporty impression is created. From the comparison of the downshifts shown in the FIG. 1, it becomes apparent that a substantially broader rotational speed range will be required for reaching a certain speed.

Figure 4:
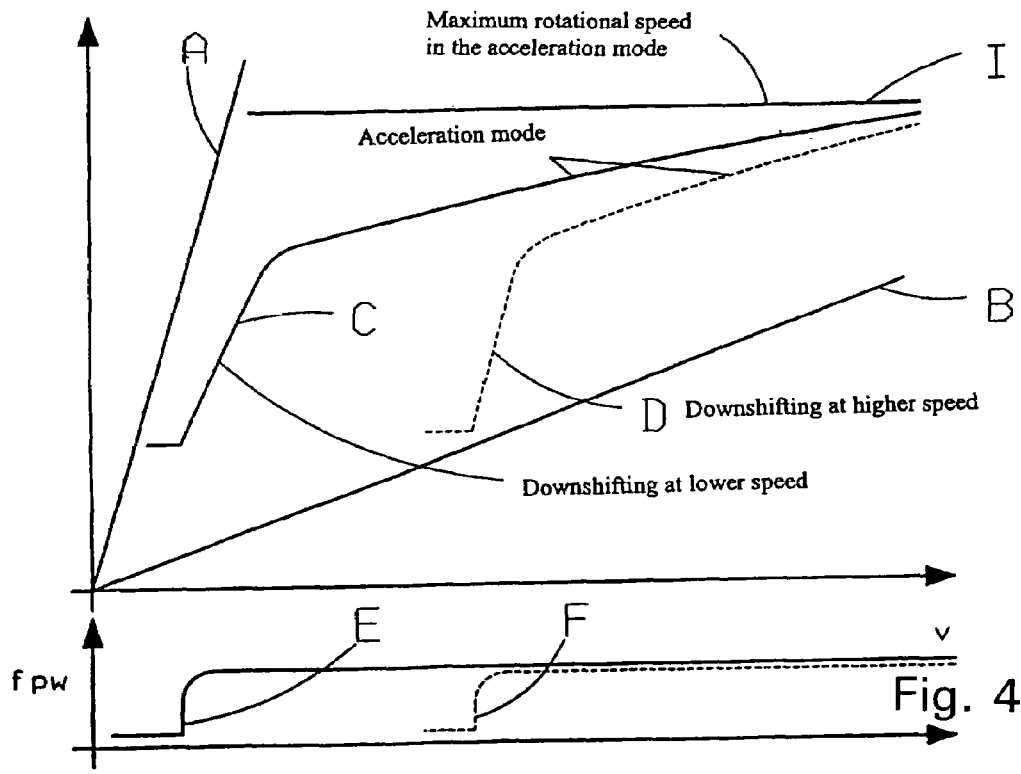
FIG. 4 is a chart showing speed vs. engine RPM, which illustrates the RPM variation at downshift in the acceleration mode, with the maximum RPM level that is used according to the invention.

Within the scope of the advantageous development of the invention shown in FIG. 4, a gas pedal dependent maximum rotational speed is provided in the acceleration mode such that unacceptable or, as the case may be, too high rotational speeds will be avoided. With increasing speed and decreasing difference between the maximum rotational speed and the actual rotational speed according to the invention the gradient will be reduced in order not to exceed the maximum rotational speed. Here, the reduction of the gradient can take place when dropping below a pre-set threshold value for the difference between the maximum rotational speed and the actual rotational speed. The maximum rotational speed curve running parallel to the v Axis has been designated with l.

Figure 5:
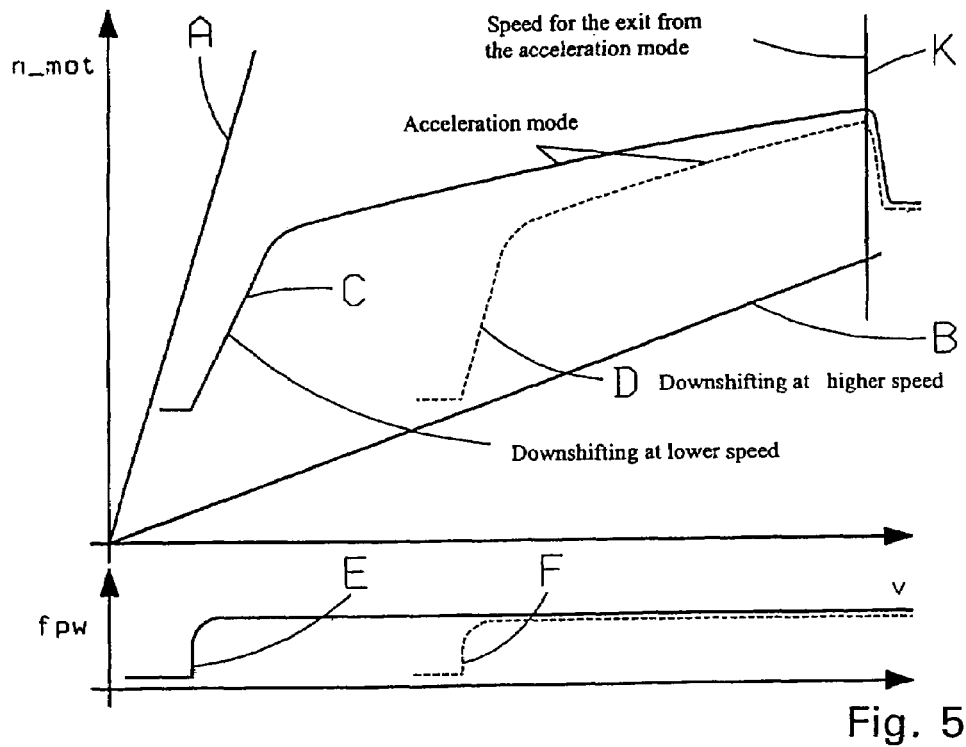
FIG. 5 is a chart showing speed vs. engine RPM, which illustrates the RPM variation in the acceleration mode, with the speed shown for the exit from the acceleration mode.

When a gas pedal value dependent maximum speed is exceeded or the gas pedal released, it is possible to leave the acceleration mode and return to the target rotational speed of the standard driving mode after the shift. This is shown in FIG. 5, wherein the gas pedal value dependent maximum speed has been marked with K.

Figure 6:
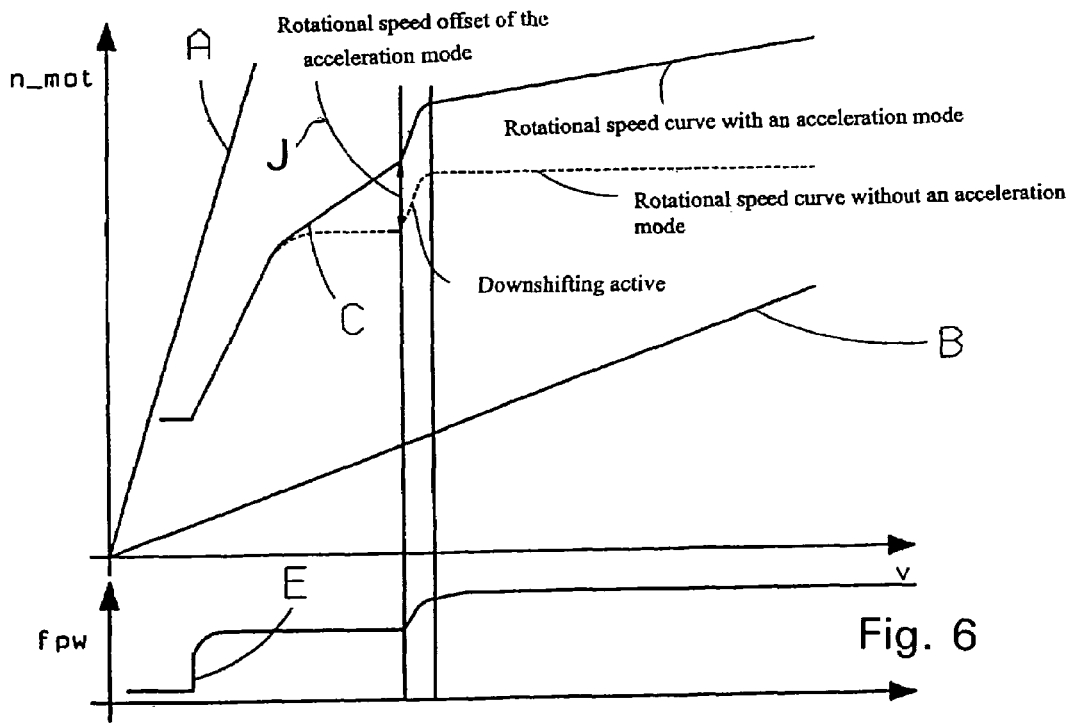
FIG. 6 is a chart showing speed vs. engine RPM, which illustrates the RPM variation at downshift during the acceleration mode.

According to the invention, the rotational speed offset between the operating point with or without the acceleration mode is established in such way that, when a renewed downshift demand is recognized during the acceleration mode, the offset will be maintained or slightly reduced so that the downshift corresponding to the driver's desire can be represented. This is clarified in FIG. 6. During the earlier described acceleration phase after the first downshift, the gas pedal value is again increased and a new downshift or, as the case may be, downward adjustment is demanded according to the invention. The offset J between the operating point of the demand for the renewed downshift, with or without the acceleration mode, will be somewhat maintained during the subsequent rotational speed change, wherein, when the downshift is completed, the course of the rotational speed according to the rotational speed gradient will be continued according to the invention.

The concept according to the invention can also analogously be used for up-shifts, which may be demanded, for example, by the reduction of the gas pedal value. Here, after the up-shift or, as the case may be, upward adjustment of the variable speed gear driving continues with a calibrated rotational speed gradient, which deviates accordingly from the flat course in a standard driving program.

REFERENCE SYMBOLS

A Course of the shortest total gear ratio
B Course of the longest total gear ratio
C Course of the rotational speed during a downshift at low speed
D Course of the rotational speed during a downshift at high speed
E Course of the gas pedal value during a downshift at low speed
F Course of the gas pedal value during a downshift at high speed
G Flat rotational speed course G as a function of the speed without acceleration mode
H Rotational speed gradient in acceleration mode
I Maximum rotational speed
J Offset between the operating point of the demand of a renewed downshift with and without acceleration mode
K gas pedal value dependent maximum speed
fpw gas pedal value
v vehicle speed

The invention claimed is:

1. An acceleration mode for a vehicle with a continuously variable transmission, comprising the steps of:
    detecting a start of a downshift;
    determining, at the start of the downshift, an acceleration mode rotational speed gradient as a function of a vehicle speed value and a gas pedal position value, wherein the acceleration mode rotational speed gradient is determined so as to be greater than a standard driving mode rotational speed gradient;
    controlling the engine rotational speed, according to the acceleration mode rotational speed gradient, thereby resulting in a faster than standard increase in the engine rotational speed during an after downshift acceleration period; and
    maintaining the acceleration mode and the greater than standard engine rotational speed gradient during the after downshift acceleration period until the engine rotational speed reaches a target rotational speed that is less than a maximum allowable engine rotation speed.

2. The acceleration mode according to claim 1, further comprising the rotational speed gradient (H) will be defined through a gas pedal value (fpw) and a vehicle velocity (v) upon entering into the acceleration mode.

3. An acceleration mode for a vehicle with a continuously variable transmission, the acceleration mode comprising:
    after a gear shift takes place, rotational speed development will continue as a function of a speed with a calibrated rotational speed gradient (H), a rotational speed gradient in the acceleration mode is greater than a rotational speed gradient within the scope of a standard driving strategy, further comprising a formula to calculate the rotational speed in the acceleration mode, the formula being:

$$n[1/\min]=n\_alt[1/\min]+ng\_acc[(1/\min)/(km/h)]* a\_fzg[km/h/s]*\Delta t$$

wherein n is the rotational speed in the acceleration mode, n_alt is the rotational speed in the acceleration mode of the previous calculation cycle, ng_acc is the rotational speed gradient (n/v-gradient) in the acceleration mode, a_fzg is the vehicle acceleration and Δt the time interval to the preceding calculation (cycle time).

4. The acceleration mode according to claim 1, further comprising a gas pedal value dependent maximum rotational speed is provided in such way that unacceptable rotational speeds will be avoided.

5. The acceleration mode according to claim 4, wherein with an increasing speed and decreasing difference between the maximum rotational speed and the actual rotational speed, the rotational speed gradient (H) is reduced in order not to exceed the maximum rotational speed.

6. The acceleration mode according to claim 5, wherein the reduction of the rotational speed gradient (H) takes place when the difference between the maximum rotational speed and the actual rotational speed drops below a pre-set threshold value for the difference between the maximum rotational speed and the actual rotational speed.

7. The acceleration mode according to claim 1, wherein when a gas pedal value dependent maximum speed (K) is exceeded or a gas pedal is released, the acceleration mode is left and a return to a target rotational speed in the standard driving mode after the gear shift occurs.

8. An acceleration mode for a vehicle with a continuously variable transmission, the acceleration mode comprising: after a gear shift takes place, rotational speed development will continue as a function of a speed with a calibrated rotational speed gradient (H), and a rotational speed gradient in the acceleration mode is greater than a rotational speed gradient within the scope of a standard driving strategy, wherein a rotational speed offset (J), between an operating point with or without the acceleration mode, is determined in such a way that when a renewed downshifting requirement is recognized, during the acceleration mode, the offset is one of maintained or slightly reduced during the downshift.

9. The acceleration mode according to claim 1, wherein a target rotational speed of the downshift is independent from the rotational speed gradient (H).

* * * * *